(12) United States Patent
Kundinger et al.

(10) Patent No.: US 6,648,043 B1
(45) Date of Patent: Nov. 18, 2003

(54) THERMOFORMER FOR FORMING AND HEAT BONDING A THERMOPLASTIC SHEET TO A SUBSTRATE

(75) Inventors: James H. Kundinger, Auburn, MI (US); Victor L. Chun, Broadview Hts., OH (US); Fredrick A. Nehring, Lee, MI (US)

(73) Assignee: Brown Machine, LLC., Beaverton, MI (US)

( * ) Notice: Subject to any disclaimer, the term of this patent is extended or adjusted under 35 U.S.C. 154(b) by 140 days.

(21) Appl. No.: 09/721,298

(22) Filed: Nov. 22, 2000

Related U.S. Application Data
(60) Provisional application No. 60/167,589, filed on Nov. 26, 1999.

(51) Int. Cl.[7] .............................................. B32B 31/04
(52) U.S. Cl. ...................... 156/499; 156/285; 156/557; 425/508; 425/388
(58) Field of Search ................................ 156/510, 285, 156/309.9, 497, 499, 557, 558, 543; 425/508, 384, 388

(56) References Cited

U.S. PATENT DOCUMENTS

| | | | | |
|---|---|---|---|---|
| 3,225,988 A | * | 12/1965 | LDrenningawson | .......... 226/19 |
| 4,674,972 A | * | 6/1987 | Wagner | ...................... 264/292 |
| 5,633,022 A | * | 5/1997 | Myers | ........................ 264/509 |
| 5,716,581 A | * | 2/1998 | Tirrell et al. | ................. 264/545 |
| 5,759,591 A | * | 6/1998 | Rhoades et al. | ............. 156/285 |
| 5,853,510 A | * | 12/1998 | Lawson | ........................ 156/64 |
| 5,975,879 A | * | 11/1999 | Dresen et al. | ............... 425/504 |

\* cited by examiner

*Primary Examiner*—Adrienne C. Johnstone
*Assistant Examiner*—Barbara J. Musser
(74) *Attorney, Agent, or Firm*—John R. Benefiel

(57) ABSTRACT

A thermoforming apparatus for forming sheets of sheet plastic onto a substrate in which a retractable substrate heater is able to be positioned over a substrate loaded into the press and energized while a plastic sheet is being heated in an oven included in the thermoformer apparatus. The plastic sheets are cut from a strip pulled from a roll of sheet material, the roll supported for side to side movement and driven by a servomotor responsive to error signals generated by a strip edge sensor to compensate for wandering of a strip edge to thereby insure accurate location of plastic sheets cut from the unwound strip.

6 Claims, 7 Drawing Sheets

THERMOFORMER FOR FORMING AND HEAT BONDING A THERMOPLASTIC SHEET TO A SUBSTRATE

CROSS REFERENCE TO RELATED APPLICATIONS

This application claims benefit of Provisional Serial No. 60/167,589, filed Nov. 26, 1999.

BACKGROUND OF THE INVENTION

This invention concerns thermoforming, a widely practiced manufacturing process involving the forming of preheated thin plastic sheets into molded parts. In this process, the plastic sheets are preheated in an oven, and then positioned aligned with tooling in a thermoforming press, the sheet drawn against tooling mold surfaces, using a pressure differential or vacuum to force the heated plastic sheet into conformity with the mold surfaces. A plug assist opposite the mold tooling is often used to preform the sheet into closer conformity to the mold surfaces when press platens are moved together to assist in the process of thermoforming the sheet against the tooling mold surfaces.

Often, in automated machines, sheet material is fed off a large roll, cut to a proper length, then clamped about its perimeter in a clamping frame. The clamping frame and sheet is advanced into an oven where the sheet is preheated to a forming temperature. The clamping frame is then advanced into a press having platens mounting mold and plug assist tooling which are brought together to cause the heated sheet to be formed into a part.

Vacuum or a differential air pressure is applied at the same time to form the sheet into conformity with the molding surfaces.

After forming, the press is opened and the completed part is removed or transferred to another station for further processing.

In twin sheet thermoforming, two sheets are preheated and formed as described, and then fused together to form a unitary part.

In another version of the thermoforming process, a preheated sheet is drawn onto a preformed porous substrate by a vacuum applied to the undersurface of the substrate. Such process has been used for applying a cover skin layer to an automotive interior trim piece.

The cover layer can be adhesively bonded to the substrate. While heat activated adhesives can provide a superior bond, to have a separate oven and coordinated handling of the substrate as well as the sheets would add considerably to the complexity and cost of the machine.

In automating this process, it is usual to feed sheet material off a roll fed into a loading area where a proper length is cut off, the cut sheet clamped into a clamping frame for transport to an oven and thereafter to the forming press. Sometimes material rolls are wound such that the edge of the web wanders laterally to some extent as the sheet is pulled off the roll. This will cause some mispositioning of the cut sheets which can cause faulty parts to be produced.

It is the object of the present invention to provide the capability of preheating a substrate to bond a thermoformed sheet thereto without requiring separate additional handling of the substrate.

It is a further object of the present invention to provide an accurately controlled feeding of sheet material into a thermoforming apparatus when being unwound from a roll of sheet material.

SUMMARY OF THE INVENTION

The above objects of the present invention and others which will become apparent upon a reading of the present specification and claims are achieved by providing a movably mounted substrate heater for each substrate tool which heater can alternatively be positioned in an advanced position extending within the forming press and cantilevered over the substrate, or in a retracted position withdrawn from the press. A powered drive arrangement is operated to shift the heater between the respective positions during cycling of the apparatus.

While the sheet to be bonded to the substrate is within the oven and being preheated, the substrate heater is in its advanced position within the forming press, and energized to heat the substrate adhesive.

When the sheet being heated in the oven reaches a proper degree of softening, the substrate heater is retracted out of the way to allow the heated sheet to be advanced into the press and positioned over the now heated substrate.

The thermoforming operation then proceeds by cycling of the press to mold and bond the sheet to the substrate surface to complete the part.

In order to prevent mispositioning of the sheets when cut from a roll of material, a roll stand is provided which is movable back and forth laterally. An edge sensor is provided which generates an error signal used to control a positioning drive system coupled to the stand to drive the same in either direction so as to compensate for any sensed mispositioning of the web edge. An electric servo motor with position feed back sensors is preferably used as the drive system.

The apparatus may be used to produce left and right parts by providing simultaneous parallel processing of two parts in the same machine.

Two side-by-side clamping frames are alternatively loaded with sheets successively cut from the roll and deposited on side-by-side loading tables positioned in front of a common sheet preheating oven. The loading tables are preferably turn tables which can rotate the cut sheets and clamping frames to reorient the grain of the sheet material to be in a desired proper relation to the substrate.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
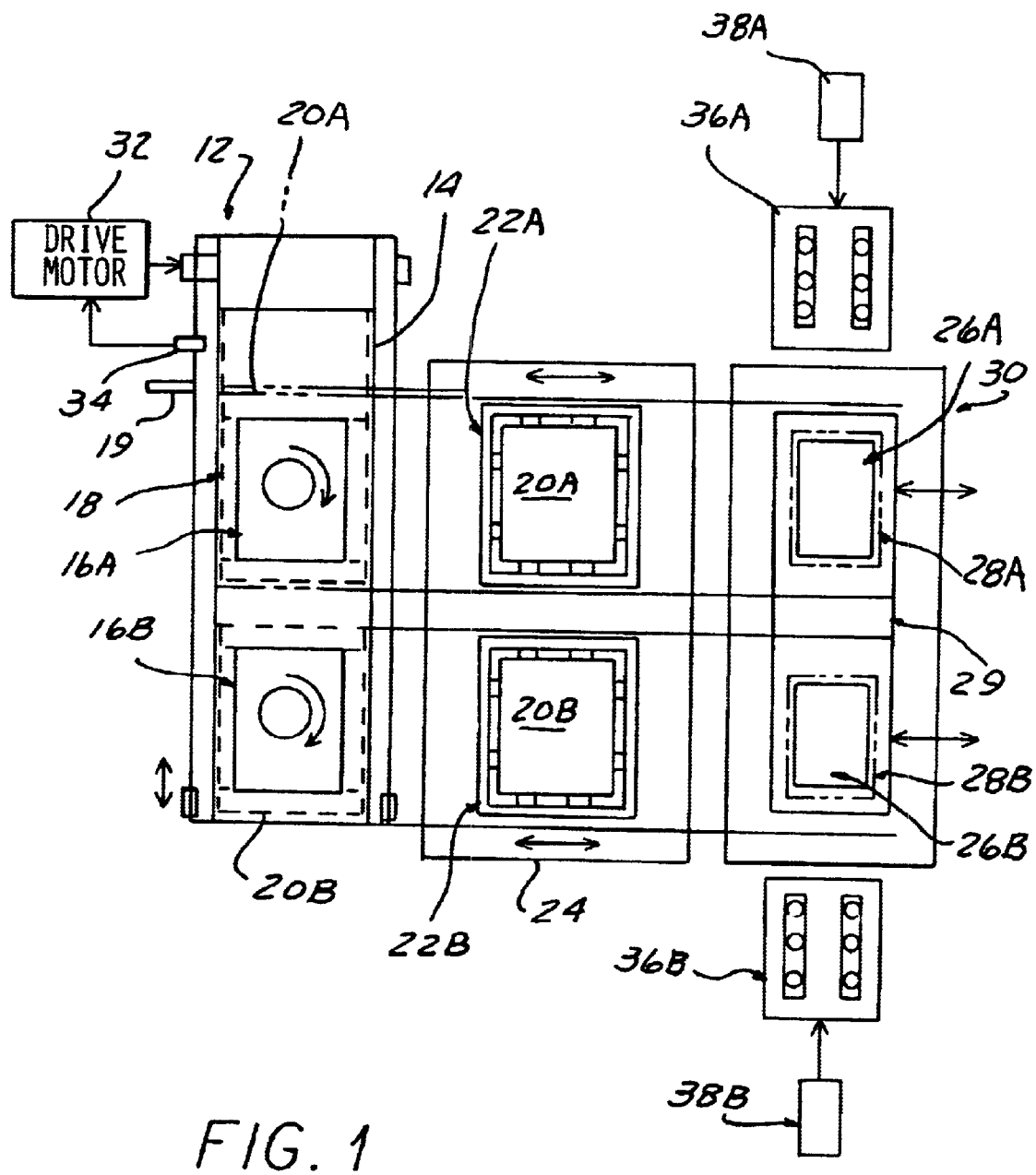
FIG. 1 is a diagrammatic plan view of the thermoformer apparatus according to the present invention.

Referring to the drawings and particularly FIG. 1, the apparatus 10 according to the present invention includes a feed roll stand 12 and a feed system for feeding a strip of plastic sheet material 14 unwound from the roll over each of a pair of aligned rotary tables 16. A movable cut off sheet support 18 has a traveling cutter 19, which is operated to grip and pull a segment of plastic sheet from the roll, cut the same off, and position a cut off piece 20A, 20B on a respective table 16A or 16B.

Clamping frames 22A, 22B are shuttled to and from ovens 24 to be positioned over the tables 16A, 16B. A common holder may be used to shuttle the separate clamping frames 22A, 22B to and form the various stations.

The sheets 20A, 20B are rotated on the tables 16A, 16B to be properly oriented with respect to preformed substrate panels 26A, 26B which have been loaded onto tooling 28A, 28B in a lower platen 29 of a thermoforming press 30.

The tables 16A, 16B are thereafter elevated to position the sheets 20A, 20B within a respective clamping frame 22A, 22B, which has clamps operated to secure the sheets 20A, 20B within the respect frame in the well known manner. After lowering of the tables, the clamping frames 22A, 22B are shuttled back into the oven 24. A common holder can be used to move both frames 22A, 22B at once. Such equipment is well known in the art and is not described here in any detail.

According to the one feature of the present invention, the roll stand 12 is mounted to be movable laterally in either direction by operation of a drive motor 32 so as to maintain the position of the web edge, which is monitored by a suitable sensor 34 positioned adjacent to one edge. Thus, if the web shifts laterally as it is unwound from the roll, there is a compensating shift laterally of the roll stand 12 in the opposite direction to bring the edge back into proper position prior to cut off of a sheet 20A, 20B.

According to another feature of the present invention, substrate heaters 36A, 36B are mounted adjacent the press 30 to be movable to an advanced position within the press 30 cantilevered out over substrates 26A, 26B loaded onto the tooling 28A, 28B on the lower platen 29, the heaters 36A, 36B thereafter retracted out of the press 30 by operation of respective positioning drive systems 38A, 38B.

The heaters 36A, 36B, preferably of the radiant quartz type, are advanced over the substrates 26A, 26B and energized after the substrates 26A, 26B are loaded onto the tooling and during the time when the corresponding sheet pieces 20A, 20B are being preheated in the oven 24. When the sheet pieces 20A, 20B begin to be advanced into the press 30, the heaters 36A, 36B are deenergized and retracted out of the way.

Figure 2:
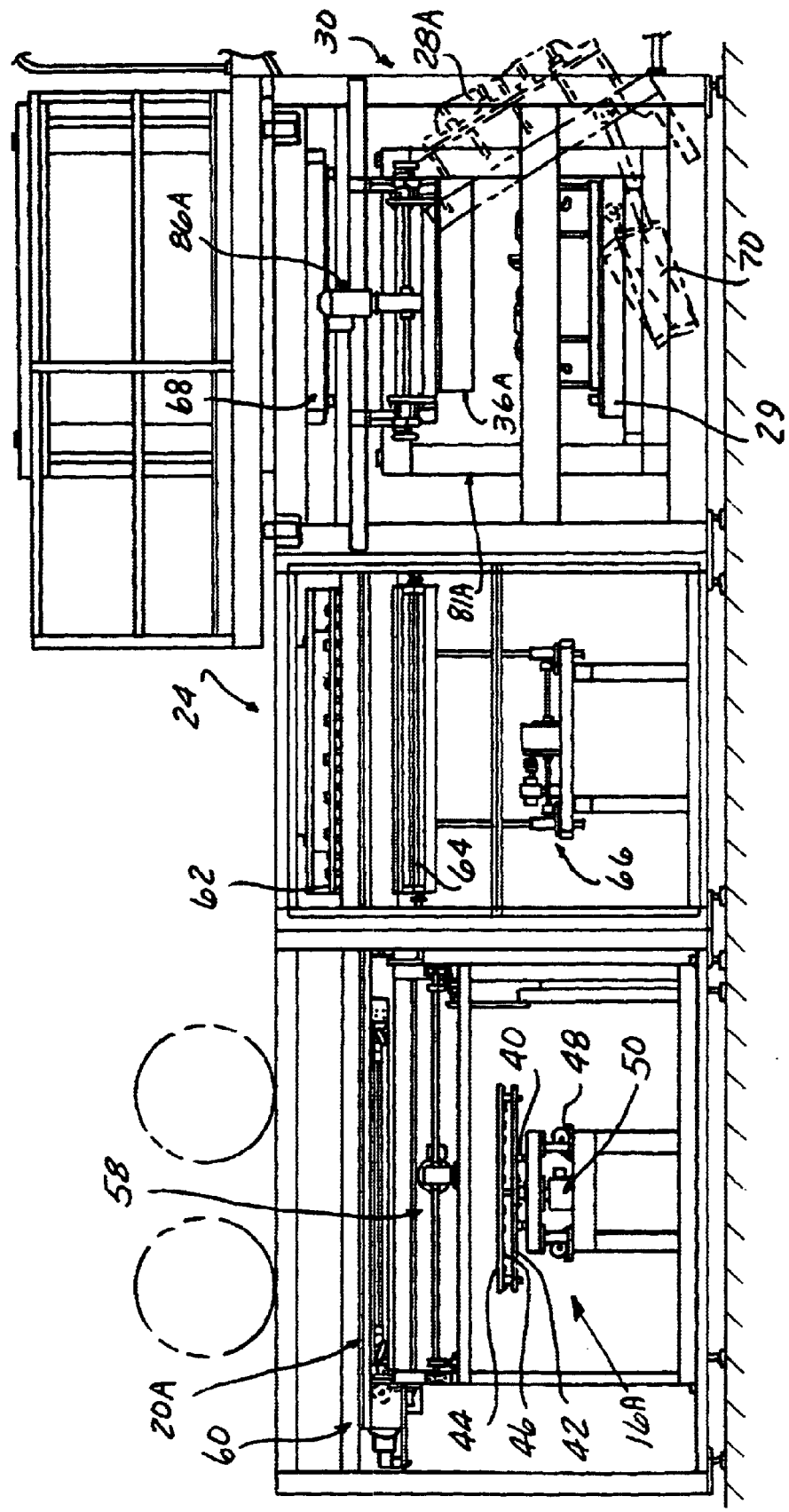
FIG. 2 is a side elevational view of a portion of the apparatus depicted diagrammatically in FIG. 1.
Figure 3:
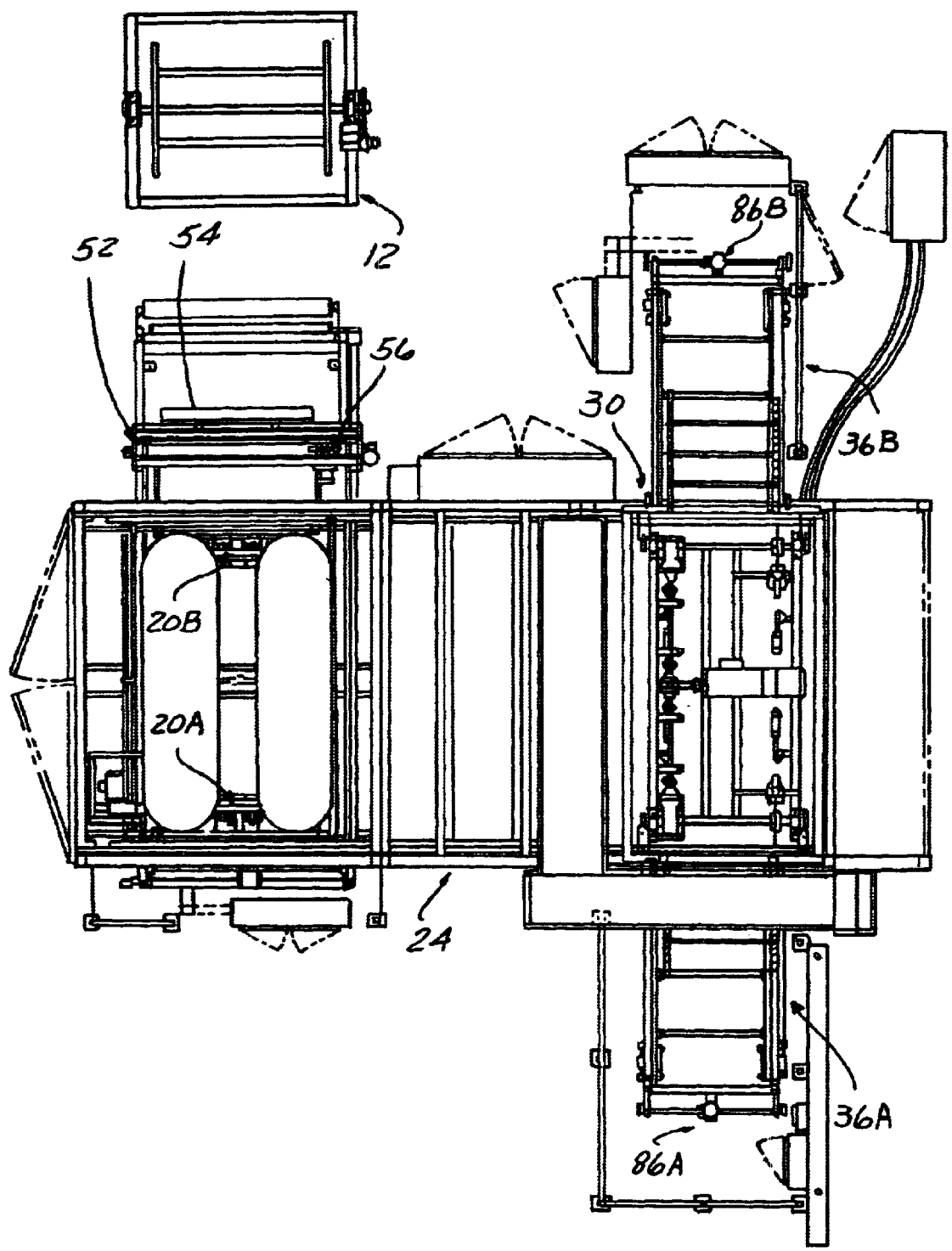
FIG. 3 is a top view of the top view of the apparatus of FIGS. 1 and 2.
Figure 4:
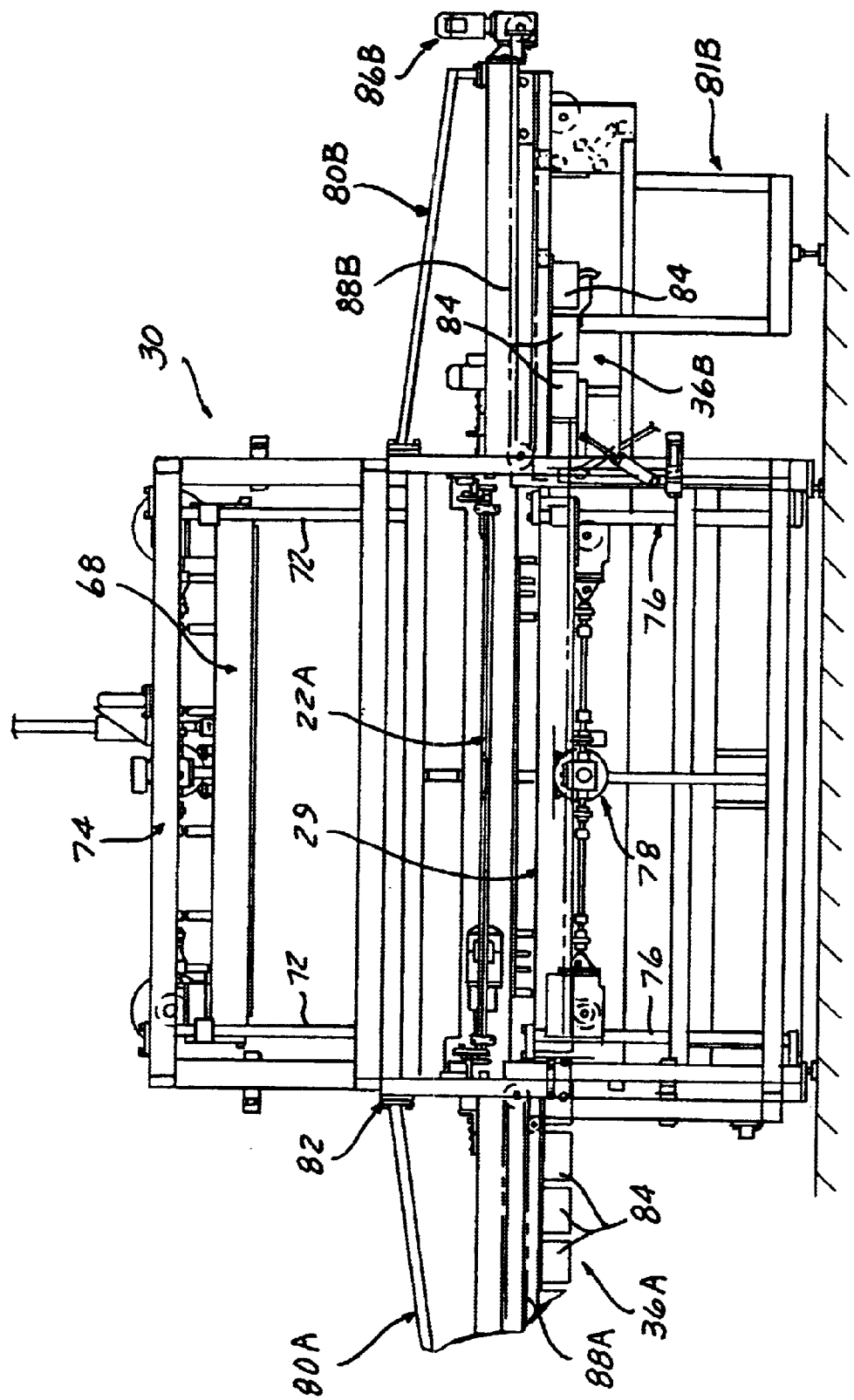
FIG. 4 is a fragmentary front elevational view of the forming press portion of the apparatus with the retracting substrate heaters.

Certain further details of such an apparatus can be seen in FIGS. 2–4. The rotary cut off tables 16A (and table 16B not shown) include ball support bearings 40 to support the weight of an under plate 42 and top plate 44. Strip heaters 46 may be provided on the under surface of the top plate 44 to prewarm the plastic sheets.

Elevator drives 48 enable raising the table 16A after a cut off plastic sheet 20A is deposited thereon and rotated by rotary drive 50.

A traveling cut off frame 52 with a gripper bar 54 and traversing cut off wheel 56 (FIG. 3) is operated by a drive system 58 to grip and pull off a section of plastic material from a material roll on the roll stand 12, and cut off a correct length to form the sheets 20A, 20B.

The clamping frames 20A, 20B are positioned over the table 16A, 16B when shuttled out of the oven 24 by a clamping frame drive motor system 60 mounted on a holder for the clamping frames 20A, 20B.

The tables 16A, 16B are elevated to position the sheets 20A, 20B within a respective clamping frame 20A, 20B with a series of clamping cylinders actuated to hold the sheets 20A, 20B about their perimeters, in the manner well known to those skilled in the art.

The oven 24 is of a well known type having a top heater 62 and bottom heater 64 supported on an elevator mechanism 66 which lowers the bottom heater 64 as the heating cycle continues to compensate for sag of the sheets 20A, 20B as they are warmed.

The clamping frames 22A, 22B are driven into the thermoformer press 30 after being heated to the proper degree, between the lower platen 29 and an upper platen 68.

The lower platen 29 is mounted to be pivoted out as shown to position the substrate tooling 28A, 28B in a position to allow loading of the substrates 26A, 26B and unloading of a completed part, one or more power cylinder 70 used to carry out the tilting.

The upper platen 68 is driven up and down on threaded posts 72 by an electric motor drive system 74, in the well known manner.

Tooling (not shown) is provided on the upper platen 68 to carry out the thermoforning, and may include a vacuum box for forming a concavity in the sheet to assist in conforming the sheet to the substrate shape, also in the well known manner.

The substrates 26A, 26B rest on the bottom platen tooling 28A, 28B, which is provided with vacuum passages for creating a vacuum forming of the sheets against the substrates 26A, 26B, again in the well known manner.

The bottom platen 29 (shown raised in FIG. 4) is similarly supported on threaded posts 76 and driven up and down thereon by an electric motor powered drive system 78.

The substrate heaters 36A, 36B are each mounted on a framework 80A, 80B cantilevered from a respective side of the press frame work 82, reinforced by a preheater frame 81A, 81B.

Figure 9:
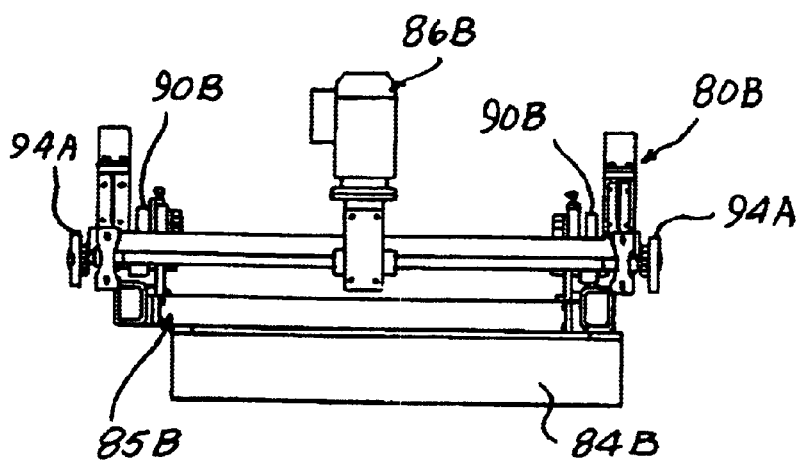
FIG. 9 is an end view of the radiant heater and related components shown in FIGS. 6 and 7.
Figure 7:
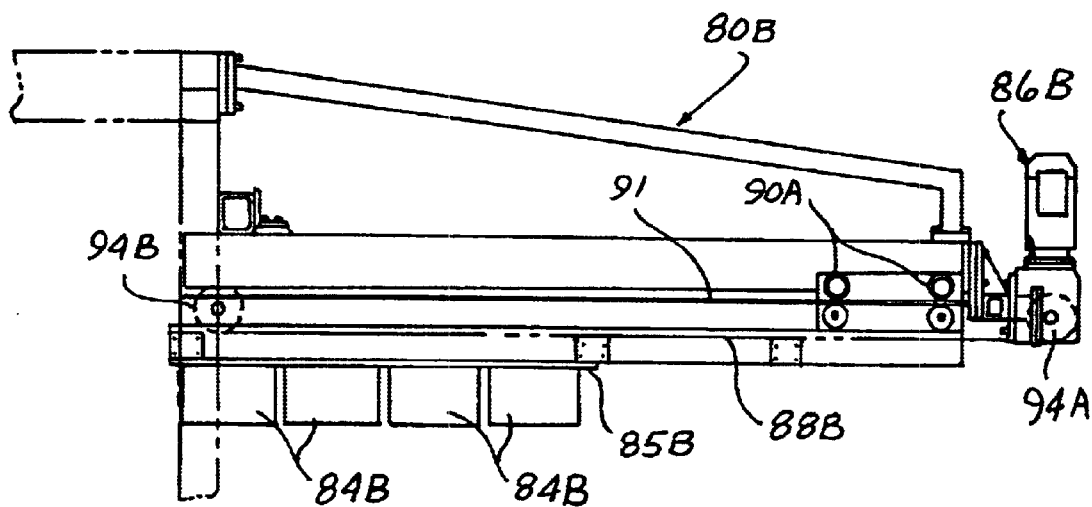
FIG. 7 is an enlarged front view of one of the retracting substrate heaters, mounting, and positioning drive system.
Figure 8:
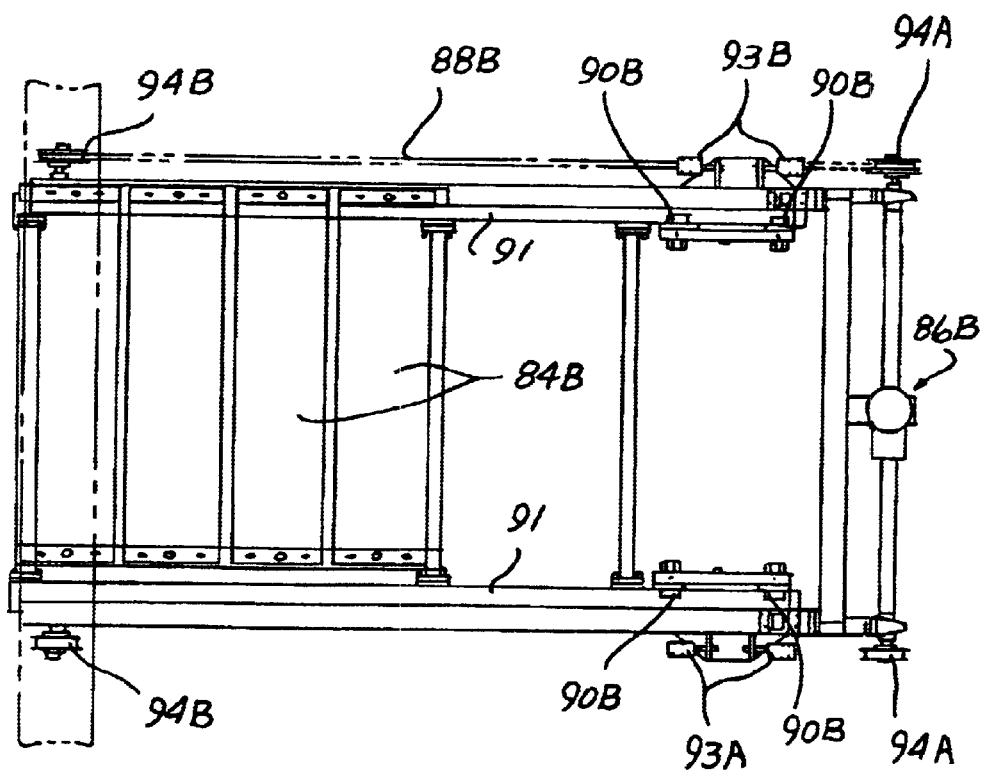
FIG. 8 is a plan view of the radiant heater and related components shown in FIG. 6.

As best seen in FIGS. 7–9, the heater units 84A, 84B are suspended from a respective holders 85A, 85B supporting opposing sets of rollers 90A, 90B which can roll along bars 91 welded to the bottom of the framework 82, driven by an electric motor drive system 86A, 86B. The heater drive system include a sprocket driven toothed belt 88A, 88B passing around on sprockets 94A, 94B to be able to be advanced into the press to be cantilevered in a position projecting over a respective substrate while the sheet pieces are being heated in the oven 34. The belts 88A, 88B are attached at either end to tensioners 93A, 93B.

Figure 5:
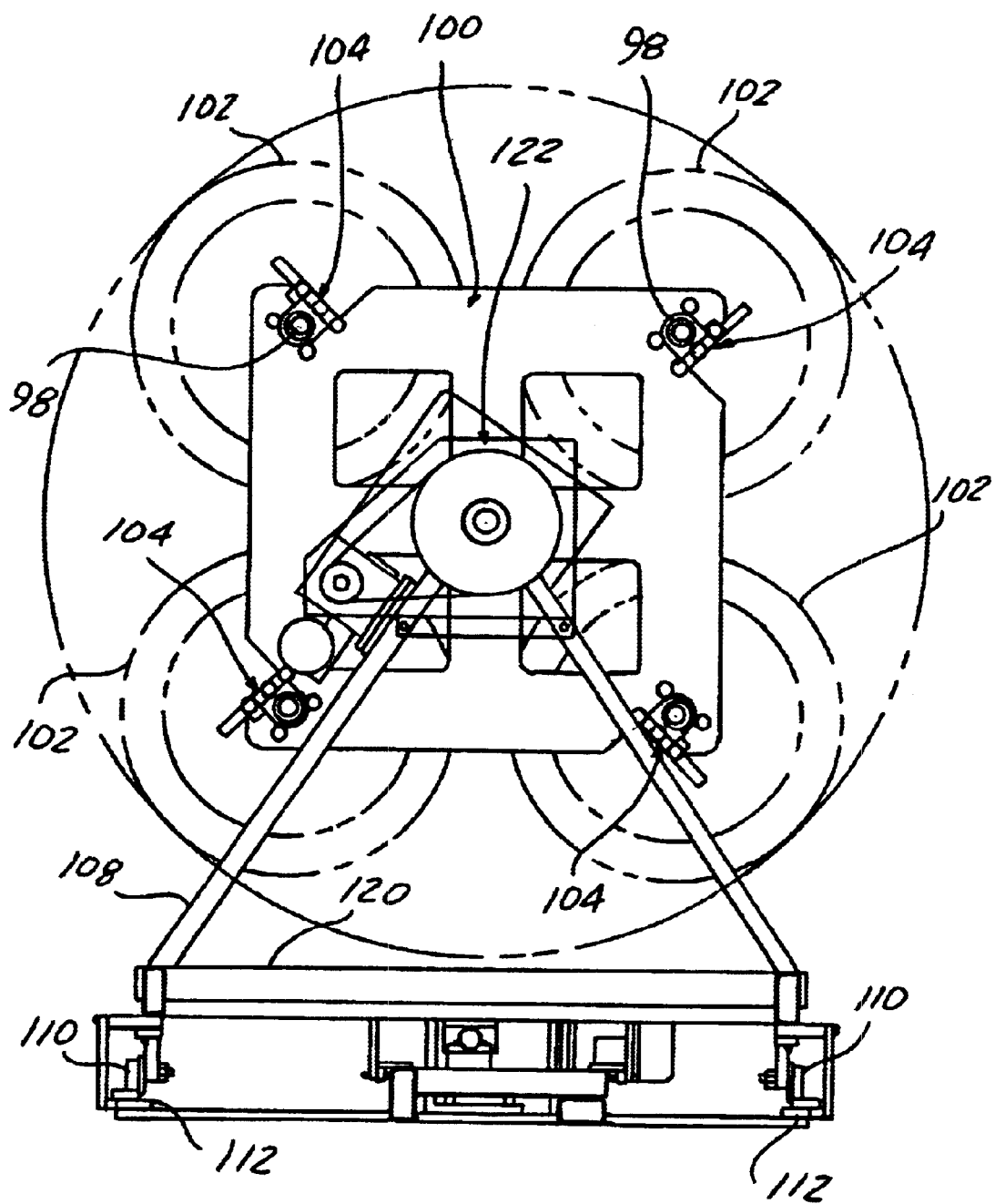
FIG. 5 is an end view of a sheet material roll stand included in the apparatus of FIG. 1.
Figure 6:
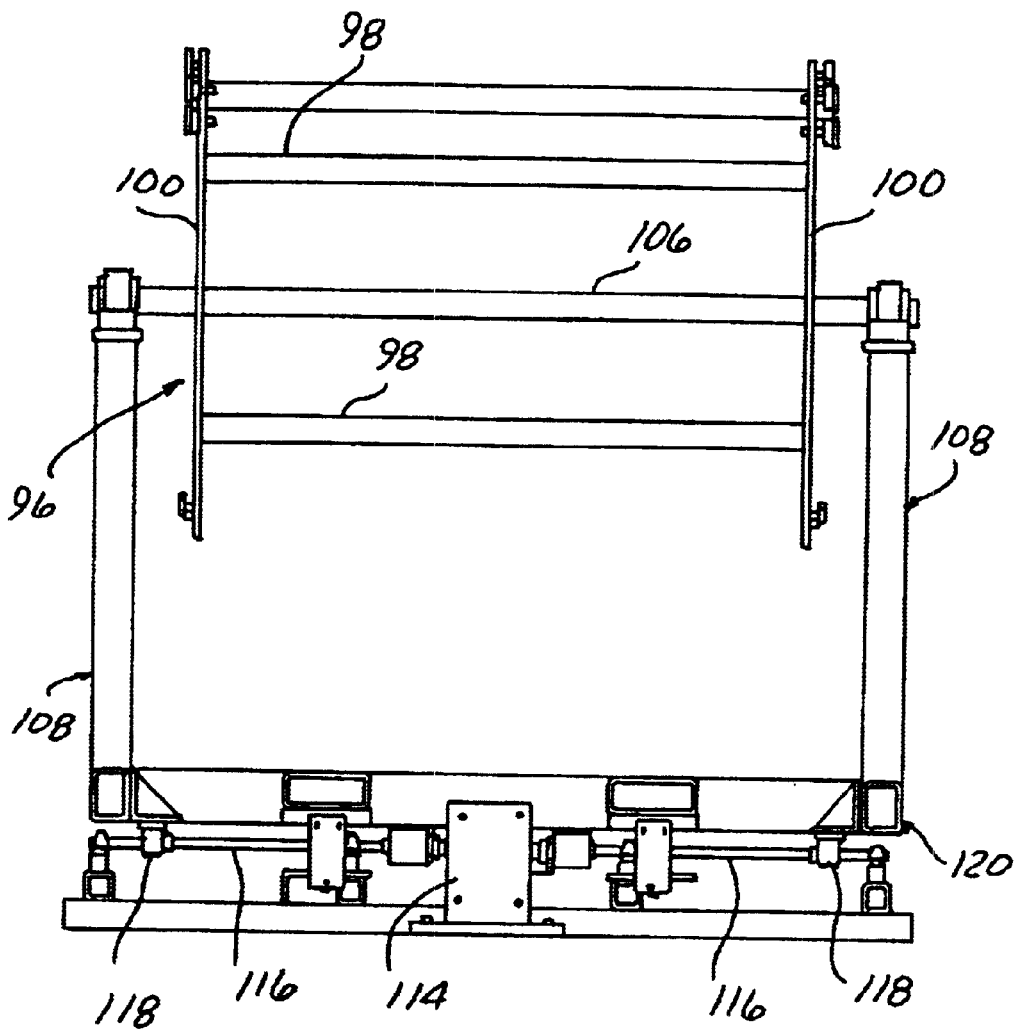
FIG. 6 is a front view of the roll stand shown in FIG. 3.

The feed roll stand 12 (best seen in FIGS. 5 and 6), is of a design able to accomodate multiple rolls of sheet material on a wheel 96 having four detachable support rods 98 each able to hold a roll 102 of sheet stock. End plates 100 are notched to receive a respective rod end, held by latches 104. An axle shaft 106 is revolvably supported on end frames 108 and a bottom frame 120 supported on roller wheels 110 resting on floor plates 112. An air motor drive 122 controlled by a manually actuated valve enables rotation of the wheel 98 to bring a selected roll 102 into proper feed position.

A VFD motor 114 drives threaded shafts 116 received in drive nuts 118 attached to the underside of the bottom frame 120 to enable side-to-side or lateral compensating adjustment of the roll stand position in response to error signals received from the sensor 34. Suitable position feed back sensors (not shown) are typically used with the positioning motor in the well known manner to produce a stable, responsive feed back control system. A servo motor could also be used instead of a VFD motor.

What is claimed is:

1. A thermoformer apparatus for forming each of a pair of sheets of plastic onto a respective one of a pair of substrates loaded onto tooling on a lower platen of a thermoformer press included in said apparatus, comprising a pair of retractable substrate heaters each including a heater holder mounted for movement between an advanced position cantilevered over said lower platen to overlie a respective substrate to position said heater on said holder over a respective substrate on said lower platen to heat the same, and a retracted position withdrawn from said advanced position over said lower platen to allow positioning of a sheet of plastic over said substrate, a drive system for moving each of said heater holders between said advanced and retracted positions, and a power supply for energizing said substrate heaters while in said advanced position to heat said substrates;

a roll of plastic sheet material, a roll stand mounting said roll, and a feed arrangement for advancing a strip of plastic from said roll and cutting plastic sheets successively from said strip for thermoforming in said apparatus;

a pair of rotary tables alternately receiving successive pieces of plastic cut from said roll, each of said rotary pair of tables rotatable after receiving a cut sheet of plastic deposited thereon to allow reorientation of each of said sheets with respect to said respective substrates prior to being introduced into said press;

an oven interposed between said pair of rotary tables and said press enabling preheating of said cut sheets prior to be introduced into said press; and a positioner clamping frame and a drive for shuttling said clamping frame between said pair of rotary tables, said oven, and said press, said clamping frame receiving both of said cut sheets deposited on said pair of tables and releasably clamping the same to carry said reoriented sheets of plastic into said oven and thereafter into said press.

2. The apparatus according to claim 1 wherein said thermoformer apparatus includes a strip edge positioner system including a roll stand mount allowing limited lateral movement with respect to the length of said strip, an edge sensor located to sense the position of said strip, and a roll stand drive controlled in response to signals generated by said sensor to said roll stand so as to maintain the position of said strip edge as said strip is unwound from said roll.

3. The apparatus according to claim 2 wherein said roll stand is mounted on rollers to allow said lateral movement, and said drive includes a screw shaft driven by an electric servo motor energized in response to signals generated by said edge sensor to move said roll stand so as to eliminate any position deviation of said strip edge.

4. The apparatus according to claim 1 wherein each sheet of plastic is held in said oven by said clamping frame prior to being transferred to said press, said substrate heater holders each advanced over said lower platen and energized at the same time sheets of plastic are held in said oven prior to being positioned in said press.

5. The apparatus according to claim 1 wherein said rotary tables include an elevator mechanism lowering the same after said sheets are clamped in said positioner clamping frame.

6. The apparatus according to claim 1 wherein said sheets of plastic cut from said roll are transported over said rotary tables in a direction aligned with unwinding of said roll of plastic, and said rotary tables are aligned along said direction, and said positioner frame is shuttled by said drive in a direction normal to said roll unwind direction to position said cut sheets side by side when being shuttled.

\* \* \* \* \*